(12) United States Patent
Pollard (10) Patent No.: US 8,054,651 B2
(45) Date of Patent: Nov. 8, 2011

(54) SIMPLE AND EFFECTIVE SELF REGULATING INDUCTIVE POWER TRANSFER SYSTEM

(75) Inventor: Keith Graham Pollard, Hatfield (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 409 days.

(21) Appl. No.: 12/376,548

(22) PCT Filed: Aug. 3, 2007

(86) PCT No.: PCT/GB2007/002973
§ 371 (c)(1),
(2), (4) Date: Feb. 5, 2009

(87) PCT Pub. No.: WO2008/017818
PCT Pub. Date: Feb. 14, 2008

(65) Prior Publication Data
US 2010/0164458 A1  Jul. 1, 2010

(30) Foreign Application Priority Data

Aug. 9, 2006 (EP) .................................... 06254194
Aug. 9, 2006 (GB) ................................... 0615829.9

(51) Int. Cl.
*H02M 3/335* (2006.01)

(52) U.S. Cl. ............................... 363/17; 363/26; 363/98

(58) Field of Classification Search .................... 363/15, 363/16, 17, 25, 26, 95, 97, 98
See application file for complete search history.

(56) References Cited

U.S. PATENT DOCUMENTS 3,728,935 A    4/1973  Magorian
(Continued)

FOREIGN PATENT DOCUMENTS

EP    0 867 899 A2    9/1998
(Continued)

OTHER PUBLICATIONS

International Search Report (PCT/ISA/210) dated Jan. 10, 2008.
(Continued)

*Primary Examiner* — Jeffrey Sterrett
(74) *Attorney, Agent, or Firm* — Buchanan Ingersoll & Rooney PC (57) ABSTRACT

An inductive power transfer system for coupling a power source to a load across an air gap is provided, including a primary unit and a secondary unit separable from the primary unit and arranged to receive power inductively from the primary unit when placed proximate thereto. The system includes a multi stage comparator for monitoring operating conditions within the secondary unit and feedback loop for transmitting a feedback signal to the primary unit when predetermined operating conditions are detected within the secondary unit. The primary unit is arranged to operate in a low power mode where power is applied to the primary winding for a minimal period during each switching cycle when no feedback signal is received and a high power mode where power is applied to the primary winding for the majority of each switching cycle when a feedback signal is received. The power transfer system functions by applying bursts of power from the primary to the secondary unit, the bursts becoming more frequent and of longer duration as the load on the secondary unit increases or the air gap increases, so as to transfer more power or maintain power as air gap losses increase. The bursts of power will also change their duration and frequency in correspondence with variations of the input power supply to the primary unit, so as to maintain the voltage regulation of the power delivered to the secondary unit.

19 Claims, 9 Drawing Sheets

U.S. PATENT DOCUMENTS

| | | | |
|---|---|---|---|
| 4,480,178 A * | 10/1984 | Miller et al. | 235/380 |
| 4,654,573 A | 3/1987 | Rough et al. | |
| 4,797,541 A * | 1/1989 | Billings et al. | 235/449 |
| 5,656,923 A * | 8/1997 | Schultz et al. | 323/207 |
| 6,028,413 A | 2/2000 | Brockmann | |
| 6,040,986 A | 3/2000 | Sakamoto et al. | |
| 6,118,249 A | 9/2000 | Brockmann et al. | |
| 6,184,651 B1 | 2/2001 | Fernandez et al. | |
| 6,301,128 B1 * | 10/2001 | Jang et al. | 363/17 |
| 2004/0218406 A1 * | 11/2004 | Jang et al. | 363/37 |
| 2005/0133497 A1 | 6/2005 | Makoto | |
| 2010/0164458 A1 * | 7/2010 | Pollard | 323/284 |
| 2011/0038190 A1 * | 2/2011 | Zimpfer | 363/126 |

FOREIGN PATENT DOCUMENTS

| | | |
|---|---|---|
| EP | 0 903 830 A2 | 3/1999 |
| EP | 0 923 182 A2 | 6/1999 |
| EP | 1 209 791 A2 | 5/2002 |
| WO | WO 99/50806 A1 | 10/1999 |

OTHER PUBLICATIONS

European Search Report (EPO Form 1507N) dated Feb. 23, 2007.
Great Britain search Report dated Dec. 1, 2006.
International Preliminary Report on Patentability (PCT/IPEA/409) dated Sep. 12, 2008.

* cited by examiner

SIMPLE AND EFFECTIVE SELF REGULATING INDUCTIVE POWER TRANSFER SYSTEM

The present invention relates to inductive power transfer systems where the power is conveyed across an air gap from a source to a load, and in particular to the regulation of such a power transfer system.

Many types of spacecraft and missile systems use an umbilical connector extending between a host and a vehicle to be launched. Such an umbilical connection allows the transfer of power and data between the host and the vehicle prior to launch and must be disconnected when the launch vehicle is mechanically separated from the host. Disconnection is typically achieved by a detachable connector assembly or by the use of small explosive devices that are controllably activated to sever the connection at an appropriate time. Timing of the disconnection is absolutely critical in such applications and the use of complex connector extraction mechanisms or an explosive charge, however small, in such environments is potentially problematic. This is because forces resulting from the mechanical uncoupling or explosion may adversely affect the planned trajectory of the newly launched vehicle or may cause damage to the vehicle systems There are many other applications where conventional energy transmission systems, using cables and connectors, present difficulties or are not feasible. For example, in factory automation systems, it may be desirable to power-up components or sub-assemblies for testing purposes as they pass a particular point in the production line. In addition, it is essential to avoid the use of electrical contacts in tools and other equipment required to operate in explosive atmospheres, extreme working environments or in medical equipment, where the presence of vapours, dust, water or other contaminants may be hazardous. Further applications include within the petro-chemical industry, in the preparation of foodstuffs and applications where a very high degree of isolation is needed between the input power source and the item being powered.

Inductive power transfer has been successfully implemented in transport systems to power a moving object like a trolley, tram, car or train by using the magnetic field generated by a powered track to induce electrical energy into a vehicle-mounted pick-up device. The general structure of an inductive power transfer installation is that there are one or more primary conductors energised with alternating current, and one or more secondary or pickup devices within the moving object which intercept the changing flux surrounding the primary conductor and convert this flux into electrical energy by means of windings.

Inductive power transfer also finds widespread use in many of today's portable devices such as mobile telephones, laptop computers, personal digital assistants, electric shavers and electric toothbrushes. These devices typically incorporate "secondary" power cells which can be recharged via inductive coupling rather than direct electrical connection, saving the user the cost and inconvenience of regularly having to purchase new cells.

However, the regulation of inductive power transfer systems can be problematic. If insufficient power is induced in the secondary (the receptor), the load is starved. If the transferred power is excessive, surplus current circulates within the secondary unit of the system, over-supplying the load and causing damage, or loss of efficiency by energy 'dumping' and the consequential generation of waste heat. Moreover, due to the thermal constraints and response times associated with electronic components of the system, it is not always practical to continuously apply the maximum power levels to the primary winding so as to transfer maximum power. Many inductive power systems employ complex circuitry to control the transfer of the inductive power.

It is an object of the present invention to provide an improved inductive power transfer system. It is a further object of the present invention to provide a simple, effective self-regulating inductive power transfer system.

From a first aspect, the invention resides in an inductive power transfer system for coupling a power source to a load across an air gap, comprising a primary unit and a secondary unit separable from the primary unit and arranged to receive power inductively from the primary unit when placed proximate thereto, the primary unit comprising a primary transformer winding and switching means for controlling the application of power to the primary winding and the secondary unit comprising a secondary transformer winding and control means for monitoring operating conditions within the secondary unit and feedback means for transmitting a feedback signal to the primary unit when predetermined operating conditions are detected within the secondary unit, wherein the primary unit is arranged to operate in a low power mode where power is applied to the primary winding for a minimal period during each switching cycle when no feedback signal is received and a high power mode where power is applied to the primary winding for the majority of each switching cycle when a feedback signal is received and wherein the control means comprises a milt-stage comparator circuit.

In this manner, bursts of power are transferred from the primary unit to the secondary unit, the frequency and duration of the bursts being dependent on the predetermined operating conditions that cause activation of the feedback signal. Regulation of the output to the load on the secondary unit is achieved through a feedback signal that has only two states, 'not present' or 'present'. These two feedback states cause the primary unit to function in one of two modes: low power, where a small pulse of energy is applied to the primary winding in each switching cycle when the feedback signal is not present and high power, where maximum power is applied to the primary winding for most of the switching cycle when the feedback signal is present. The control means is implemented as a multi-stage comparator which presents a simple, low cost and effective means by which regulation of the power transfer system can be achieved.

In the high power operating mode, power is preferably applied to the primary winding except during a dead-band period at the beginning and end of each switching cycle. The incorporation of a short dead-band within the switching cycle eliminates problems associated with thermal constraints and the rise and fall times of electronic components within the primary unit, The control means is advantageously arranged to monitor the voltage induced in the secondary winding and to output a signal to the feedback means when the induced voltage exceeds a first predetermined threshold voltage causing a feedback signal to be transmitted the primary unit. Hence, although at least some energy is induced in the secondary winding when it is positioned close to the primary unit, the primary unit remains defaulted to its low power mode unless this exceeds the predetermined first threshold value. This results in minimal power demand on the primary at initial power application.

The control means is preferably also operable to monitor the voltage level in a storage capacitor coupled to the secondary winding and to activate an output switch to apply power to the load when the voltage level exceeds a second predetermined threshold voltage. This arrangement serves to isolate the load when the power transferred to the secondary unit is insufficient to power the load.

The control means also monitors the voltage applied to the load and outputs a signal to the feedback means when the applied voltage exceeds a third predetermined threshold voltage causing the feedback signal to the primary unit to be deactivated. The control unit subsequently outputs a signal to the feedback means when the applied voltage falls below a fourth predetermined threshold voltage causing a feedback signal to be re-transmitted to the primary unit. In this way, the bursts of power being transferred by the primary unit become more frequent and of longer duration as the load on the secondary unit increases or as the air gap increases, so as to transfer more power or maintain power as air gap losses increase. The bursts of power will also change their duration and frequency in correspondence with variations of the input power supply to the primary unit so as to maintain the voltage regulation of the power delivered to the secondary unit. This results in a substantially constant voltage being delivered to the load by the secondary unit, despite variations in the input supply to the primary unit, variations in the air gap between the primary and secondary units and variations in the current demanded by the load.

A tuning capacitor is preferably connected in parallel with the secondary winding and is arranged to resonate at a predetermined frequency when the width of the air gap separating the transformer cores of the primary and secondary windings is at the maximum value that will allow operation of the power transfer system. This results in the energy coupling coefficient remaining more constant over variations of the air gap distance.

The width of the air gap between the primary and secondary winding preferably lies in the range 1 to 6 mm so as to achieve optimum efficiency when transferring power levels of up to 200 Watts.

In a low power mode operation, power is preferably applied to the primary winding for 5% of the switching cycle, while in a high power mode operation, power is preferably applied to the primary winding for 95% of the switching cycle. These switching waveforms in combination with the regulation provided by the control unit and feedback system provide optimum supply to the load when required and compensate for the thermal constraints and response times associated with electronic components of the system.

In a preferred embodiment, the power source in the primary unit is arranged to produce an output dc voltage of 270V. Most current aircraft typically generate 200V, 3-phase at 400 Hz, which when full wave rectified provides nominally 270Vdc, but newer and future aircraft types are specified to provide 270Vdc prime power. Most current aircraft typically generate 200V, 3-phase at 400 Hz, which when full wave rectified provides nominally 270Vdc, but newer and future aircraft types are specified to provide 270Vdc prime power. The primary unit is preferably carried by a host aircraft and the secondary unit is carried by a launchable vehicle. This arrangement avoids the use of an umbilical connection to transfer power between the host and the vehicle prior to launch and the problems associated with disconnection discussed above.

An embodiment of the present invention will now be described with reference to the accompanying drawings in which.

Figure 1:
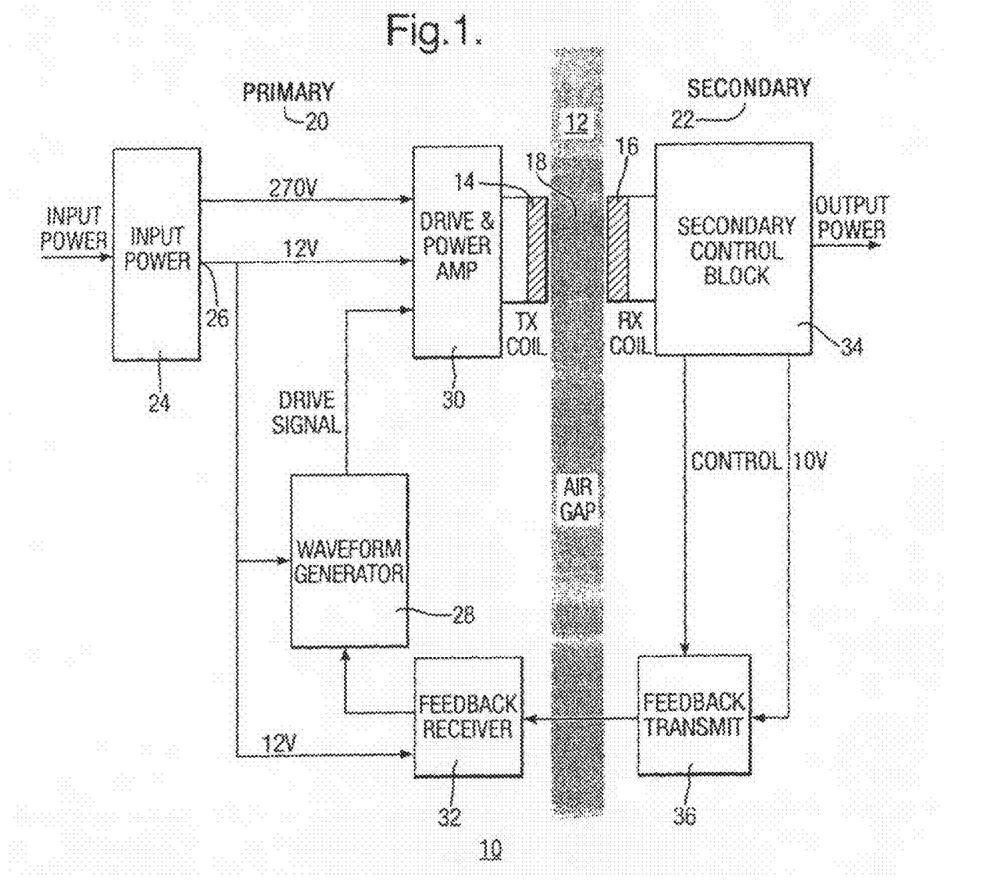
FIG. 1 is a block diagram representation of an inductive power transfer system according to a preferred embodiment of the present invention.

Referring now to FIG. 1, there are shown the main components of an inductive power transfer system 10 designed for use in an aircraft environment. The power transfer system comprises a power transformer 12 having a primary power transmitting winding 14 and a secondary power receiving winding 16 separated by an air gap 18. The air gap 18 can be varied between 1 mm and 10 mm, dependant upon the physical size of the power transformer and the quantity of power to be transferred, with automatic compensation for variations in the gap being catered for. However, it should be recognised that the power transfer efficiency falls as the size of the air gap increases. Ideally, it has been found that the air gap should be no less than 1 mm and no more than 6 mm for optimum system efficiency when transferring power levels of up to 200 Watts. The system comprises primary unit components coupled to the primary winding 14 and secondary unit components coupled to the secondary winding 16, with feedback components to feed a signal from the secondary unit 22 to the primary unit 20.

The primary unit 20 includes an input power module 24 to which a primary ac power input of 200V, 3-phase or dc power of 270V is applied. Most current aircraft typically generate 200V, 3-phase at 400 Hz, which when full wave rectified provides nominally 270Vdc, but newer and future aircraft types are specified to provide 270Vdc prime power. However, it should be appreciated that by suitable selection of components and power transformer windings, ac or dc input power supplies ranging from a few volts to some hundreds of volts may be accepted, depending on the particular application. The primary unit 20 is carried by the host aircraft (not shown) while the secondary unit is separable from the primary unit and is carried by a launchable vehicle (not shown).

The input power module 24 accepts single phase or 3-phase alternating current, or direct current power input and includes a local power supply 26 which performs appropriate conversion to achieve an output of 12V running at a load current of nominally 20 mA to supply the electronics components in the primary unit 20 of the power transfer system. A waveform generator 28 provides the central control function of the inductive power transfer system's primary unit 20 operation and outputs two signals to a power amplifier stage 30 to enable the application of power to the transformer 12 in a push-pull format. This push pull format is needed to ensure a flux reversal within the magnetic core of the transformer primary each half-cycle, thereby avoiding any tendency for core saturation through 'dc' offsets. The primary winding 14 of the power transformer 12 is wound with a number of turns to suit the input voltage to the system. The waveform generator 28 responds to an input from a feedback receive module 32 in the primary unit 20 which serves to receive and process a feedback signal from a feedback transmit module 36 in the secondary unit 22 of the power transfer transformer 12. A driver within the power amplifier stage 30 level shifts the signals into a format suitable for the output power amplifier that energises the primary winding 14. This output power amplifier of the power amplifier stage 30 is itself powered directly from the input power module 22.

The secondary unit 22 of the power transfer system 10 comprises a control block 34 coupled to the secondary winding 16 of the power transformer 12 which serves to convert energy induced in the secondary winding to a dc voltage and to transmit signals to a feedback transmitter module 36. The secondary winding 16 of the power transformer 12 is wound with a number of turns to suit the output voltage of the system to its external load (not shown). The feedback transmitter module 36 transmits a signal to the feedback receive module 32 when certain operating conditions are met. The control block 34 also contains an output switch (shown in FIG. 7) which serves to isolate the load when the level of the voltage converted from energy induced in the secondary winding 16 is below a predetermined value, and then, to apply power to the load when the voltage exceeds this value.

Figure 2A:
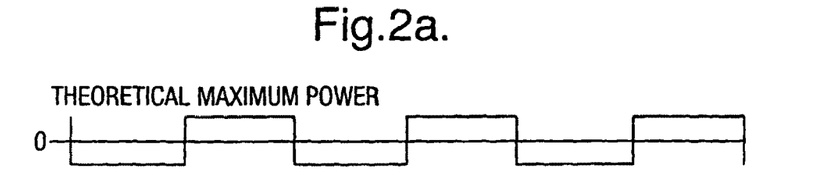
FIG. 2 is a timing diagram illustrating idealised transformer waveforms of the inductive power transfer system of FIG. 1.

Before the configuration and operation of the various individual elements of the inductive power transfer system are described in more detail, the basic operation of the system will be now be described with reference to the timing diagrams shown in FIGS. 2*a-c*.

As described above, the energy applied to the primary winding 14 of power transfer transformer 12 reverses its polarity throughout each switching cycle so as to avoid a tendency towards transformer saturation. Because of thermal constraints and because the electronic components in the primary unit 20 are unable to instantly switch between their ON and OFF states due to finite energy storage within the devices and the time needed to dissipate such stored energy, it is not practical to continuously apply the theoretical maximum power levels shown in FIG. 2*a* to the primary winding 14. For this reason, the power waveform is modified as shown in FIGS. 2*b* and 2*c*, to include a 'deadband' period so to account for the component characteristics noted above.

Figure 2B:
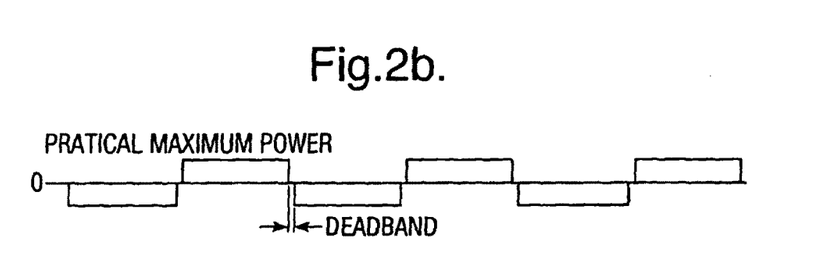
Figure 2C:
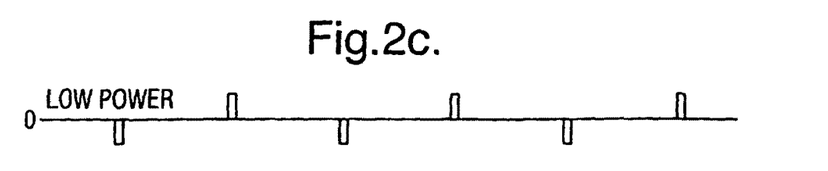

Thus the primary unit 20 of the power transfer system 10 of the present invention advantageously operates in only two modes: a high power mode as shown in FIG. 2*b* and a low power mode shown in FIG. 2*c*. In the low power mode, energy is switched to the power transfer transformer 12 for only a short period and equates to the application of only nominally 5% of its maximum power capability during each half switching cycle. In the high power mode, energy is transferred for most of the switching cycle, except for the short period of time known as the 'deadband', between each reversal of polarity of the power in each switching cycle. This high power mode equates to the primary side circuitry applying its maximum power capability of to the primary winding which is nominally 95% of an ideal square waveform's duration and the deadband 5%. Hence, the primary side of the inductive power transfer system is essentially an oscillating power amplifier which is capable of operation, once powered up, in two modes only, that is, low power and high power.

As will be described in more detail below, the waveform generator 28 contains a clock generator that, when divided down, provides the fundamental switching frequency of the system plus the logic circuitry that generates the practical maximum power and low power waveforms. It is apparent from the timing diagrams in FIG. 2, that the overall frequency of operation remains the same for the high and low power modes, with only the energy applied to the transformer 12 changing (ignoring any low order effects arising from the harmonic content of the switching waveform).

At initial power application and/or if the secondary unit 22 of the inductive power transfer system 10 is not present, no feedback signal is received by the feedback receiver in the primary unit and the waveform generator defaults to the low power output drive signal mode, i.e., only a small pulse of energy is applied each half-cycle. This results in a minimal power demand by the primary unit 20 on the host platform (in this instance an aircraft), and also a low magnetic field emission from the primary unit 20 of the transformer 12. When a feedback signal is received at the primary unit 20 from the feedback transmitter 36 in the secondary unit 22, the feedback receiver 32 outputs a logic state change signal to the waveform generator 28 resulting in the high power output drive signal being generated and hence maximum power being applied to the primary winding of the transformer. Thus, there are only two operating states of the primary unit 20, low power mode, when no feedback signal is detected by the primary unit's feedback receiver 32, and high power mode, when a feedback signal is detected by the primary unit's feedback receiver 32. When the primary side of the inductive power transfer system is powered up, it defaults to the low power mode and remains in the low power mode unless 'commanded' into the high power mode by the presence of a feedback signal from the secondary side.

As will be described in more detail below, the secondary winding 16 of the power transformer 12 is resonated at the switching frequency by the addition of a suitable tuning capacitor connected in parallel with the secondary winding 16. It should be appreciated that the inductance of the secondary winding 16 changes in relation to the air gap distance (i.e. the distance between the cores of the transformer's primary 14 and secondary 16 windings). Therefore, the inductance of the secondary winding 16 is determined at the maximum air gap that will be encountered when both the primary 20 and secondary 22 units are in their operating positions and then by selecting the appropriate tuning capacitor so as to cause resonance with this inductance at the switching frequency. This then results in the energy coupling coefficient remaining optimally constant over variations of the air gap distance, since resonance improves the coupling at a larger air gap position and, with a smaller air gap when the resonance effect is diminished, the reduced gap improves coupling, one change so offsetting the other.

When the secondary winding 16 is positioned close to the primary winding 14, then at least some energy is induced in the secondary winding 16, but unless this exceeds the predetermined threshold value, the primary unit 20 will remain defaulted to its low power mode. However, the primary to secondary coupling, even when not exactly at resonance due to the variation of distance between the primary unit core and the secondary unit core and the resultant change of winding inductance, is greatly enhanced by the resonance described above.

As will be also be described in more detail below, the energy induced in the secondary winding 16 is rectified to produce a dc voltage, smoothed and applied to a large value storage capacitor 76 (shown in FIG. 7). If, for example, the secondary winding 16 and its associated circuitry were to be positioned distant from the primary unit 20 and then gradually moved there toward, the dc voltage so produced in the secondary unit 22 will increase as the two windings 14, 16 of the transformer 12 approach each other. The control block 34 of the secondary unit 22 comprises a multi-stage voltage comparator (shown in FIG. 7) that is initially powered by the voltage developed from the induced energy in the secondary winding 16. This multi-stage voltage comparator circuit consumes very little power in its own right and so does not require that a high degree of energy be transferred from the primary unit 20 to the secondary unit 22. The multi-stage comparator and its voltage reference are arranged and biased such that they settle into a predetermined default state at much lower voltages than those encountered under normal operating conditions, so ensuring stability as the system starts up. Then, when the first stage of the multi-stage comparator circuit has determined that sufficient energy has been induced in the secondary winding 16, a signal is output to the feedback transmit stage 36 shown in FIG. 1.

The presence of this is feedback transmit signal ('feedback signal present state') is detected by the feedback receiver 32 in the primary unit 20 and the waveform generator 28 changes its output signal from the low power mode to the high power mode, so as to cause the power transformer 12 to be driven to its full extent. As a consequence of the primary unit 20 going from the low power mode to the high power mode, the energy induced in the secondary transformer winding 16 immediately increases and the dc voltage storage capacitor 76 (shown in FIG. 7) rapidly ramps up.

Prior to this ramp up, the output switch 78 (shown in FIG. 7) in the secondary unit 22 is set to its default state of isolating the load, but as the ramping voltage on the storage capacitor 76 passes through the level of a second voltage comparator VC2 of the multi-stage comparator of the control block 34, the output switch 78 (shown in FIG. 7) is enabled and power is applied to the load. Provided that the system is not overloaded, the voltage on the capacitor 76 continues to ramp upwards, supplying more energy to the load and simultaneously storing more energy in the capacitor.

A third comparator of the multi-stage comparator of the control block 34 monitors the voltage applied to the load and on detection of the application of a predetermined limit voltage, an override signal is transmitted to the first comparator causing the feedback transmit signal to cease. Upon the loss of this feedback signal to the feedback receiver 32 in the primary unit 20, the primary unit's low power mode is adopted. With the primary unit 20 going to its low power mode, the energy being transferred from the primary unit 20 to the secondary unit 22 is now insufficient to maintain the power to the load, so the storage capacitor 76 maintains this load, but the voltage on the storage capacitor 76 gradually falls as a result. The third comparator, which has been arranged with some hysteresis, detects any such fall in the voltage on the storage capacitor and removes the override on the first comparator's output, so causing the feedback signal to transmit and thence the primary unit 20 to return to its high power mode.

In this manner, the primary unit 20 will alternate between low and high power modes at a rate determined by the voltage present on the storage capacitor 76 in the secondary unit 22 and the load upon that capacitor, as well as the hysteresis setting of the third comparator. This arrangement results in the output voltage presented to the load in the secondary unit 22 ramping between pre-determined limits, in correspondence with the bursts of high power being transmitted by the primary unit 20. Typically, for a secondary unit load being powered at nominally 28Vdc, the voltage ramping, which is effectively a ripple voltage, experienced by that load will be between 28.5V and 29.5V. However, it should be understood that other output voltages can be achieved by suitable circuit component selections.

Thus, this power transfer system functions by applying bursts of power from the primary 20 to the secondary 22 unit, the bursts becoming more frequent and of longer duration as the load on the secondary unit 22 increases or the air gap increases, so as to transfer more power or maintain power as air gap losses increase. The bursts of power will also change their duration and frequency in correspondence with variations of the input power supply to the primary unit 20, so as to maintain the voltage regulation of the power delivered to the secondary unit 22. This results in a substantially constant voltage being delivered to the load upon the secondary unit 22 despite variations of the input supply to the primary unit 20, variations of the air gap between the primary 20 and secondary 22 units and variations of current demanded by the load.

Regulation of the output voltage in the secondary unit 22 is achieved through a feedback signal that has only two states, 'not present' or 'present'. These two feedback states cause the primary unit 20 to function in only two modes, low power when the feedback signal is not present and high power when the feedback signal is present. There is no modulation or any other form of signal processing placed upon the feedback signal other than it being present (i.e., switched on) or not present (i.e., switched off). The feedback signalling rate of alternations between the feedback signal ON and the feedback signal OFF occur at relatively low frequencies, which are well within the audio frequency band (less than 15 kHz) and allow the components providing this feedback function to need only modest performance requirements. The actual signalling rate and the durations of the individual on or off periods of the feedback signal depend principally upon the air gap dimensions between the primary and secondary sides, the nature of the prime input power to the primary side and the level of loading present upon the secondary side.

If the secondary unit 22 of the system were to be removed, as would occur at the launching of a vehicle carried by the host aircraft, then the primary unit 20 will revert to its low power mode, since a feedback signal can no longer be present. Also, in the event that an excessive load is placed on the secondary unit 22, the power transfer system 10 will not be able to deliver sufficient energy, so causing the output voltage to fall below specified limits and to eventually pulse in its high/low power mode as the loading reduces the secondary voltage to below its 'detect' level. This effect provides some 'protection' to the host platform's (aircraft) power supply system should an overload fault occur within the secondary unit's load, for example, through battle damage.

Figure 3:
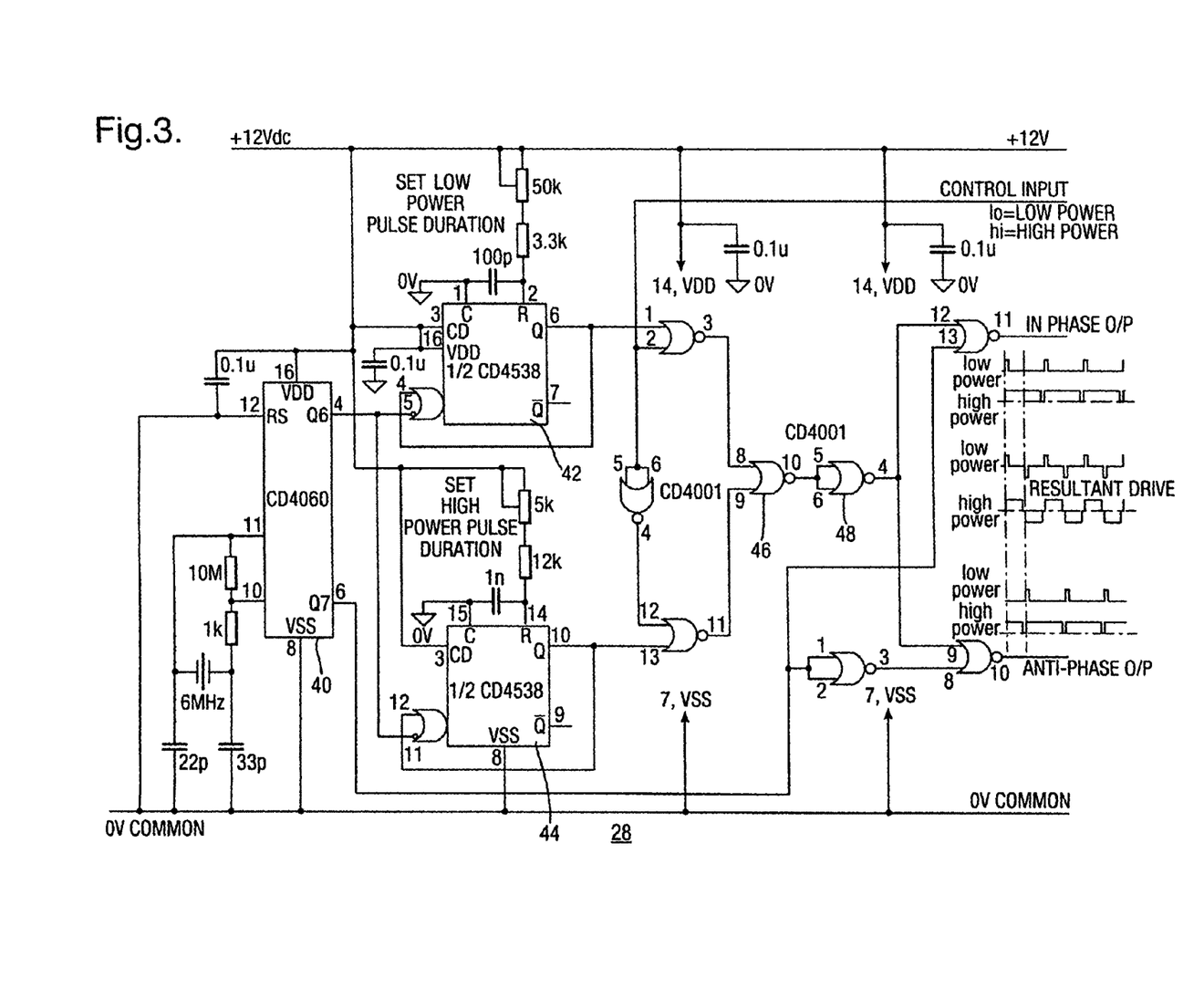
FIG. 3 is a circuit diagram of the configuration of the waveform generator of the inductive power transfer system of FIG. 1.

Referring now to FIG. 3, the configuration and operation of the waveform generator will be described in detail. The waveform generator 28 includes a clock oscillator plus divide down device (CD4060) 40 that have been configured to provide two rectangular waveform signal outputs with a 50:50 duty cycle, the Q6 output being at 93.75 kHz and the Q7 output being at 46.875 kHz. This clocking arrangement causes the fundamental switching frequency of the signal applied to the power transfer transformer 12 to be at 46.875 kHz. However, it should be appreciated that other frequencies could be employed within the inductive power transfer system given a suitable selection of transformer core material and other operational considerations such as allowable electromagnetic emanation levels.

The dual monostable function provided by the devices 42, 44 (CD4538) has been configured to provide two pulse outputs whose durations are independently adjustable, one pulse duration alluding to the low power and the other pulse duration to the high power functions described above. Two quad, dual input NOR gate devices 46 and 48 (CD4001) provide the selection of the high or low power waveforms from the dual monostable devices 42, 44 by the logic state of the CONTROL input and output the selected pulses at the clocking frequency, but separated by an interval equating to twice the clocking frequency, to the power amplifier drive circuitry 30. The waveforms presented at the right hand unit of FIG. 3 illustrate these pulse outputs.

It should be appreciated that the low power and high power pulse durations provided by the adjustable circuitry described herein may also be fixed in their settings and all the logic functions illustrated in FIG. 3 could be integrated into a single programmed logic device. Typically, the 'low power' pulse duration will be 5% of the 'full pulse' duration and the 'high power' pulse duration will be 95% of the 'full pulse' duration.

Figure 4:
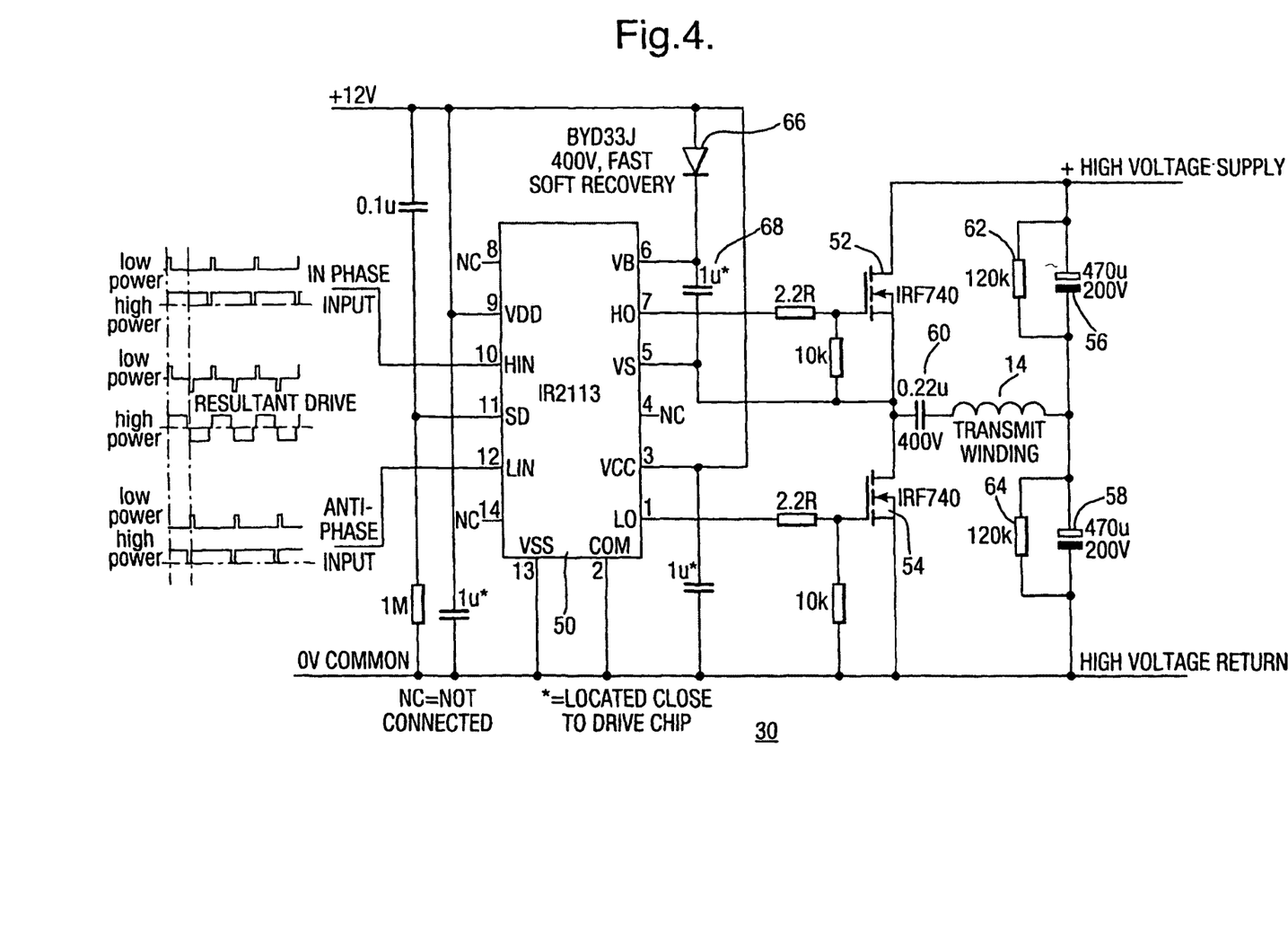
FIG. 4 is a circuit diagram of the power amplifier and its driver stage of the inductive power transfer system of FIG. 1.

The configuration and operation of the power amplifier and its driver are shown in more detail in FIG. 4. An IR2113 device 50 takes the two output signals provided by the waveform generator 28 and buffers these signals such that the power FET devices 52 and 54 in the output amplifier 30 are correctly driven. The high voltage supply to one end of the primary winding 14 is dynamically centre-tapped by two 470 µF capacitors 56 and 58 connected in series, such that half the high voltage supply potential is present at this end of the power transfer transformer's primary winding 14. The other end of the primary winding 14 is ac coupled between the two series connected power FETs 52 and 54. The capacitor 60 achieving this ac coupling is selected to present a nominally series resonant circuit, in conjunction with 'open circuit' inductance of the primary winding, at the switching frequency. Here, this inductance is determined without the secondary unit's core being in the vicinity of the primary unit's core, which would cause an increase of the primary unit coil's inductance. FETs 52 and 54 are alternately switched ON and OFF, with only one FET being ON at any instant. This has the effect of the end of the primary winding 14 coupled thereto being alternately connected to the high voltage supply and then to the high voltage supply return nodes. This is known as a half bridge circuit arrangement.

Since the energy switched into the transformer 12 is essentially the same on each half cycle, but reversed in its polarity, the potential at the junction of the two 470 µF capacitors 56 and 58 remains essentially constant, at one half of the input supply potential. Two 120 kΩ resistors 62 and 64 connected in parallel with each on the two capacitors 56 and 58 are provided to discharge the capacitors on power removal and also balance any small dc leakage currents within the capacitors. Capacitors 56 and 58 also provide a secondary function of energy storage, so as to maintain power transfer through short transient interruptions of the prime input power supply to an extent determined by the output load present on the system plus the capacitance presented by capacitors 56 and 58.

The IR2113 device 50 of the power amplifier driver provides a drive signal to each FET 52 and 54 in a manner that rapidly switches each FET ON and OFF at the appropriate instant. This rapid switching action is achieved by active 'totem pole' connected switching devices within the output stages of the 1R2113 device 50. The IR2113 device 50 also serves to 'lift' the drive signal for the upper FET 52 to nominally half the high voltage supply potential. This is achieved by the IR2113 device's 50 internal circuitry plus a charge pump provided by the lower power FET 54 plus a fast switching diode 66 and the associated 1 µF capacitor 68.

Figure 5:
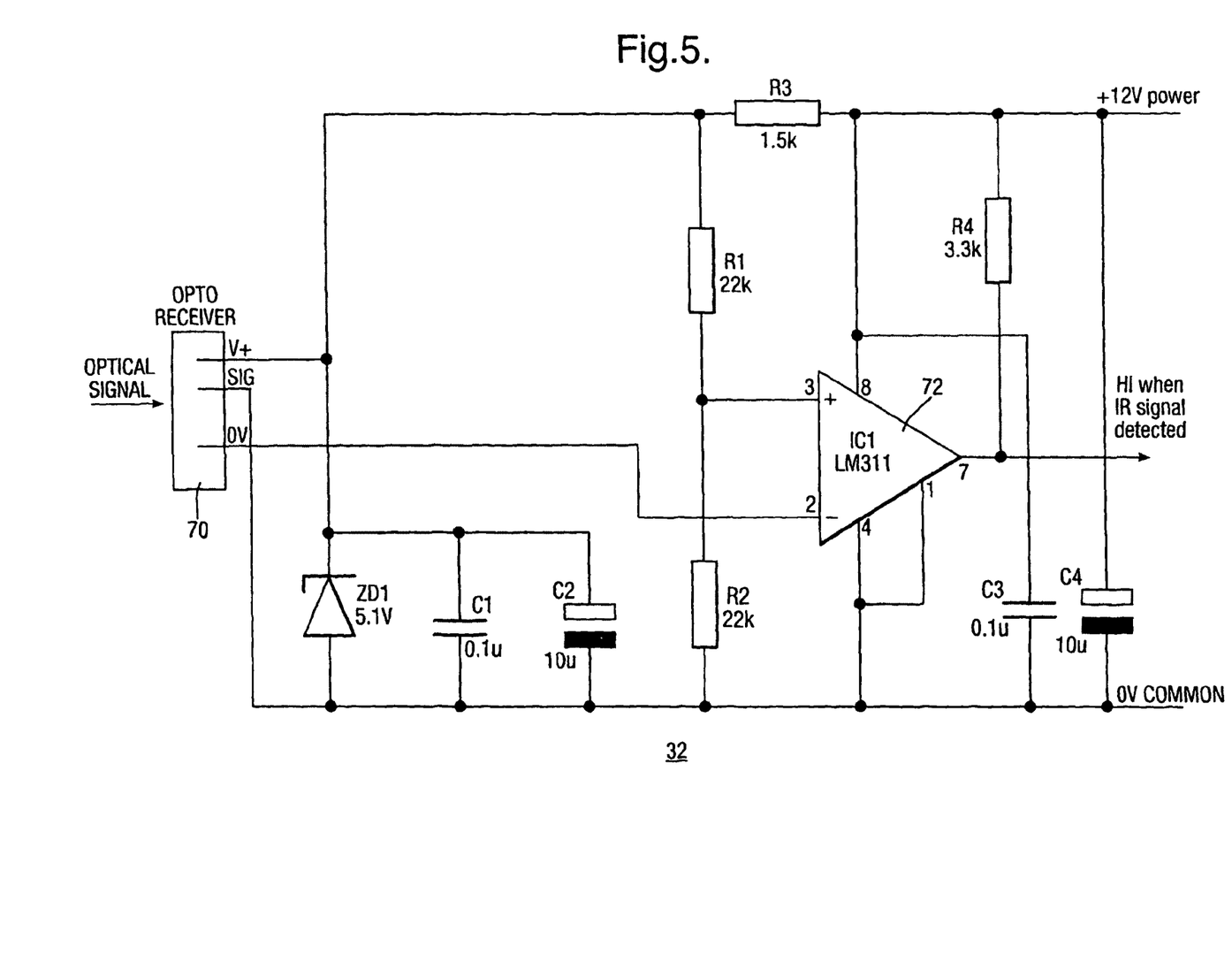
FIG. 5 is a circuit diagram of the feedback receiver of the inductive power transfer system of FIG. 1.

The feedback receiver 32 is illustrated in FIG. 5 and comprises an IR receiver device 70 containing a band-pass filter centred around 38 kHz to minimise any spurious responses, plus a voltage comparator device 72 to provide buffering and level shifting functions. This circuit provides a logic low output when no IR signal is detected (i.e., no feedback signal is detected) and a logic high output when an IR signal is detected (i.e., feedback signal detected), so matching the requirements of the waveform generator depicted in FIG. 3.

Figure 6:
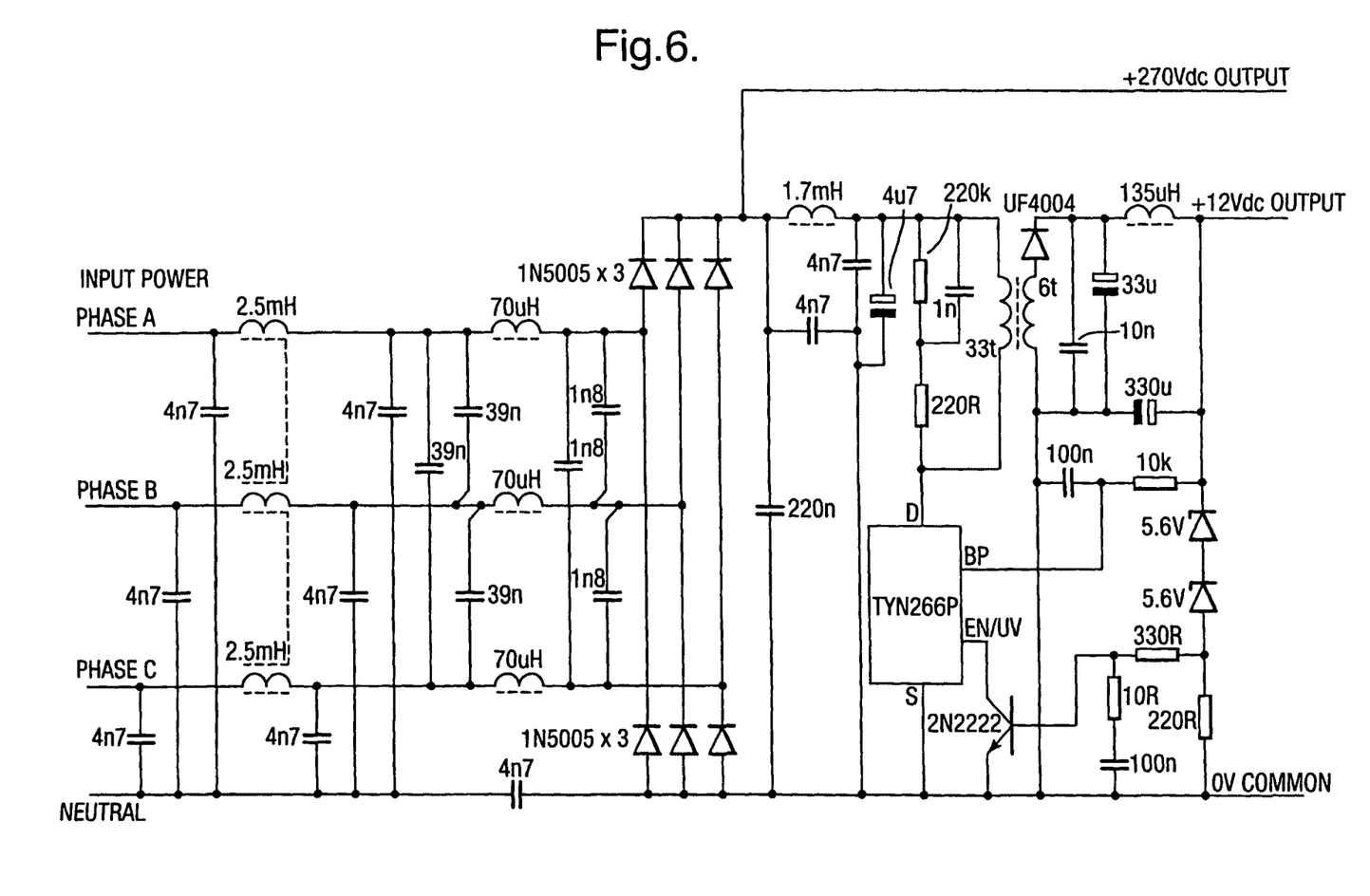
FIG. 6 is a circuit diagram of the power supply system pertaining to the primary unit stage of the inductive power transfer system of FIG. 1.

The primary unit's power supply arrangements are illustrated in FIG. 6, which for this explanation is configured to accept a 200Vac, three phase, 400 Hz supply as provided by a typical aircraft. However, other power sources are equally applicable to this power transfer system. FIG. 6 shows that the input supply from the host aircraft is full wave rectified, after filtering, to so provide nominally 270Vdc. This 270Vdc supply is the primary power supply to the power amplifier shown in FIG. 4. FIG. 6 also shows a low power dc to dc converter circuit that converts the 270Vdc supply to 12Vdc, this 12V dc then powering the waveform generator shown in FIG. 3, the driver stage shown in FIG. 4 and the feedback receiver shown in FIG. 5.

Figure 7:
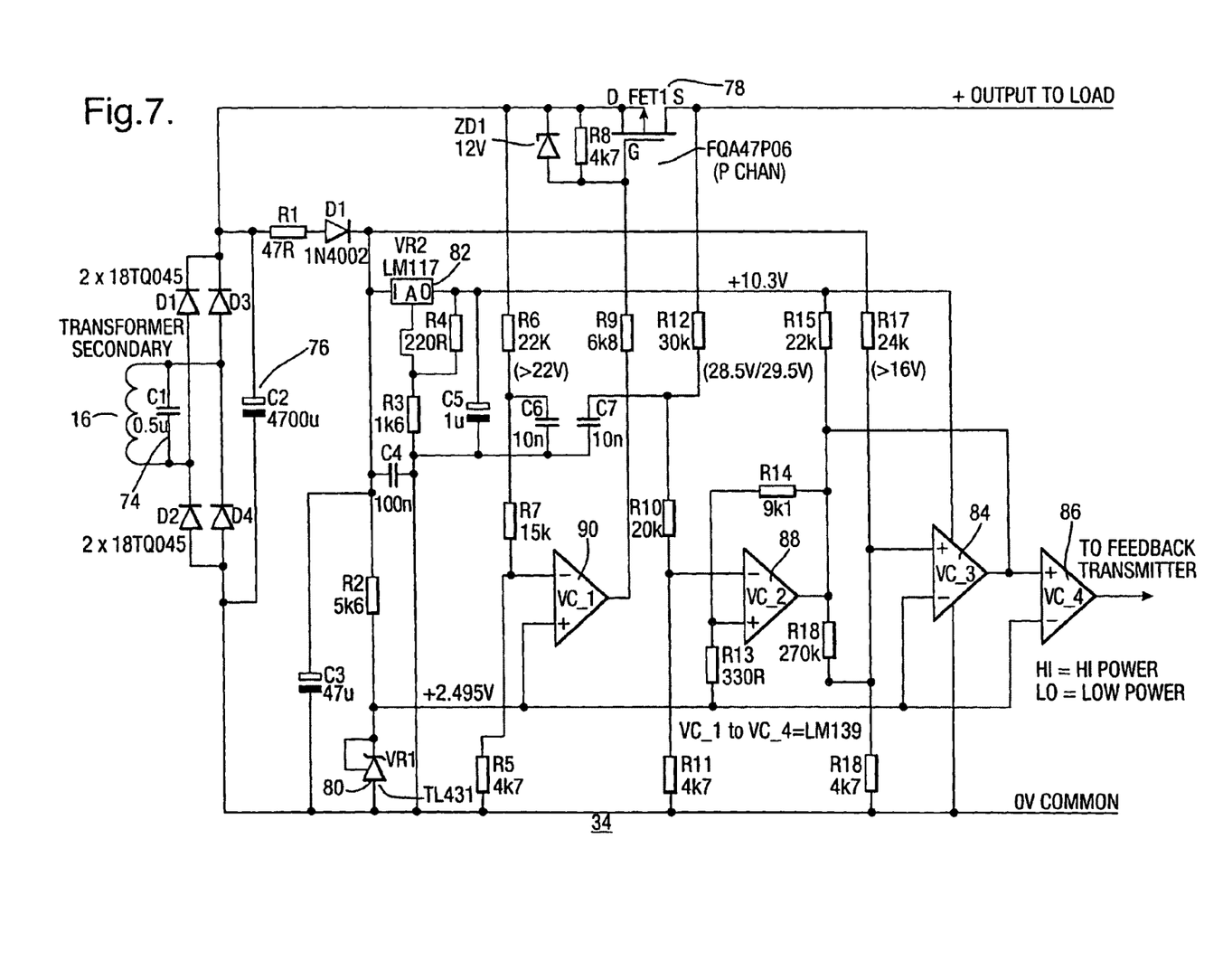
FIG. 7 is a circuit diagram of the secondary unit control module of the inductive power transfer system of FIG. 1.
Figure 8A:
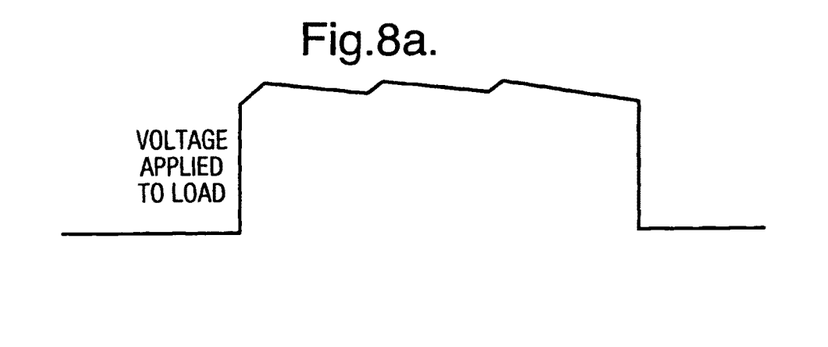
FIG. 8a is a waveform representing the voltage applied to the output load from the secondary unit of FIG. 7.

The secondary unit control module is presented in FIG. 7. This aspect of the inductive power transfer system is now described in detail with reference also to voltage waveforms of FIGS. 8a, 8b and 8c, since it provides the principal control activities needed to effectively regulate the power being transferred across the air gap 18. The numeric values presented within this description have been adopted to suit an inductive power transfer system that outputs nominally 29V to the load. However, it should be understood that other output voltages could equally well be provided with an appropriate selection of numeric values and circuit components, depending on the load requirements.

When power is initially applied to the primary unit 20 and the secondary unit 22 being too remote therefrom, there can initially be no feedback signal from the secondary unit 22, since this unit will not yet be powered up by the inductive transfer from the primary unit 20. Thus, the primary unit defaults to its low power mode, so radiating a low energy alternating magnetic field. In this primary side low power mode and without the secondary side present to absorb any power from the primary side, plus the short pulse (approximately 5% of the full power waveform) being applied to the primary side's power transfer inductor, the resultant prime input power to the primary side is minimal. This minimal prime input power condition (i.e., the 'standby' input power), is affected by the duration of the 'short pulse' and the rate of rise of current in the primary coil's inductance, which is of a ramping nature. Since the secondary side is remote from the primary side, there can be no energy picked up by the secondary side and hence zero voltage present on C2 of FIG. 7. The secondary side is so electrically inert. This condition is represented by point A on timing diagram of FIG. 8b.

As the secondary unit is moved closer to the primary side, the radiated energy will be 'captured' by the transformer core geometry of the primary and secondary units and some (limited) inductive coupling will occur. This will cause an alternating voltage to be induced in the transformer secondary winding 16 shown in FIG. 7 and the 'capture' effect is enhanced by the secondary core being tuned to resonance or near resonance with the primary side switching frequency (due to the parallel tuned circuit formed by the secondary winding's self inductance and the tuning capacitor 74 (C1)). The alternating voltage developed by this tuned circuit is then full wave rectified by the diode bridge, D1 to D4 to so produce a dc voltage. This dc voltage is smoothed and, in conjunction with the current available from the rectified supply, will charge the energy storage capacitor 76 (C2). The voltage present on capacitor 76 (C2) will depend upon the air gap dimensions between the primary and secondary sides, increasing as distance is reduce, the comparator circuit consuming negligible current. This condition is represented by points B to C on the timing diagram of FIG. 8b.

Whilst the distance between the primary and secondary sides is too great to provide significant coupling, the voltage on C2 of FIG. 7 will remain below the lowest comparator threshold, point C on LINE B of FIG. 8. The feedback signal will remain off and the primary side will remain in its low power mode. Here, there will be a slight increase of prime input power to the primary side, as some limited energy is absorbed by the secondary side. As the coupling between the primary side and the secondary side is increased, by further moving the secondary side nearer to the primary side, the voltage on C2 will continue to increase, so approaching point C of FIG. 8b.

At this stage, the output load switch (FET1) 78 has not yet been switched on, which will be explained hereafter, and since the comparator circuit demands very little current, the voltage on storage capacitor 76 (C2) will continue to rise. The rising voltage on capacitor 76 (C2) is filtered via R1, D5 and C3 and then applied to the voltage reference generator 80 (VR1) via R2. The regulation circuit R1, D1 and VR2 sets the comparator circuit's operational power supply to nominally +10V. Simultaneously, the voltage reference for all the comparators, nominally +2.5V, is established when the rising voltage on storage capacitor 76 (C2) has achieved nominally +5V. This arrangement ensures that the comparator circuit's voltage reference is established 'early' in the secondary side's power up sequence.

The still rising voltage on storage capacitor 76 (C2) is applied to the input of voltage regulator 82 (VR2), via R1 and D5, which will maintain its output at nominally +10V once its input exceeds +13V. This regulated +10V supply is then employed to power the multi-stage comparator circuit and also the feedback transmitter 36, which will be described below. Thus, the comparator circuit's voltage reference of +2.5V via VR1 and the circuit's power supply of +10V are established and stable, once the rising voltage on storage capacitor 76 (C2) has reached +13V. Also, the output of comparator 84 (VC3) is low, so causing the output control signal to the feedback transmitter from comparator 86 (VC4) to also be low.

When the rising voltage on capacitor 76 (C2), filtered via R1, D5 and C3, and sampled via R17 and R18 achieves approximately +17V (V1 in FIG. 8b), the output from comparator 84 (VC3) goes high, via R15. At this juncture, the output from comparator 88 (VC2), which too connects to R15, is also high. This condition is illustrated by point C in timing diagram of FIG. 8b and at this time the voltage on capacitor 76 (C2) remains disconnected from the output load as illustrated in the timing diagram of FIG. 8a.

Figure 8B:
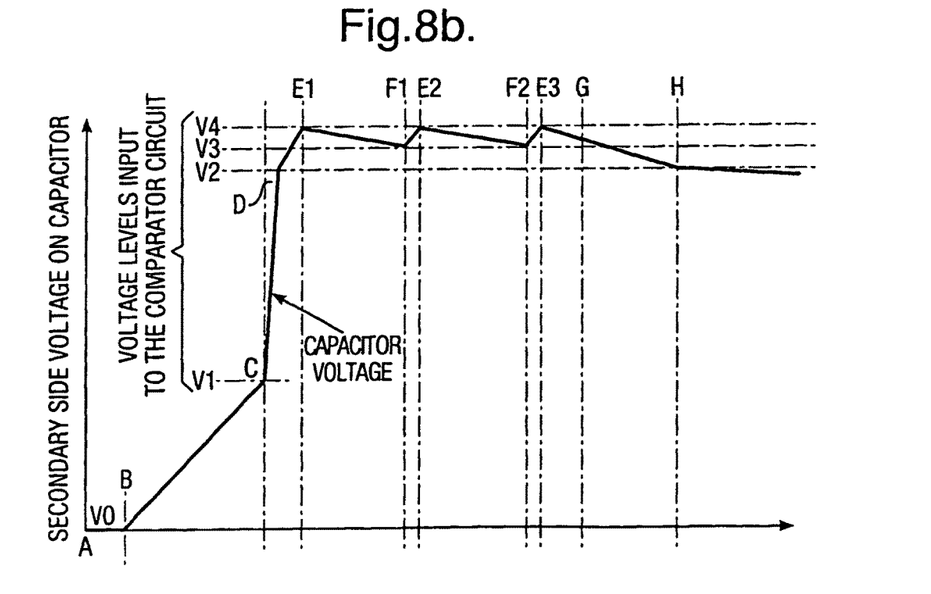
FIG. 8b is a waveform representing the voltage present on capacitor 76 (C2) of FIG. 7.
Figure 8C:
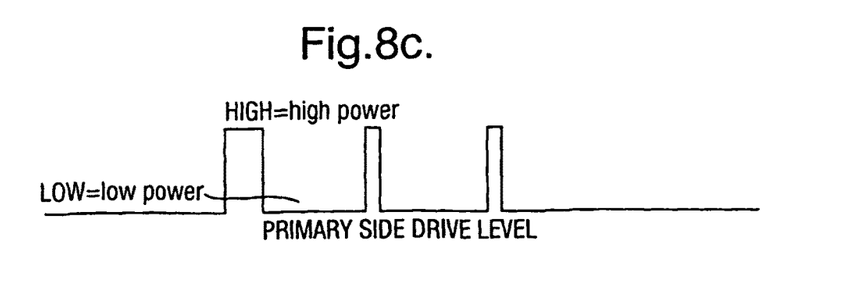
FIG. 8c is a waveform representing the on/off state of the feedback signal sent by the secondary unit control module of FIG. 7 to the primary unit.
Figure 9:
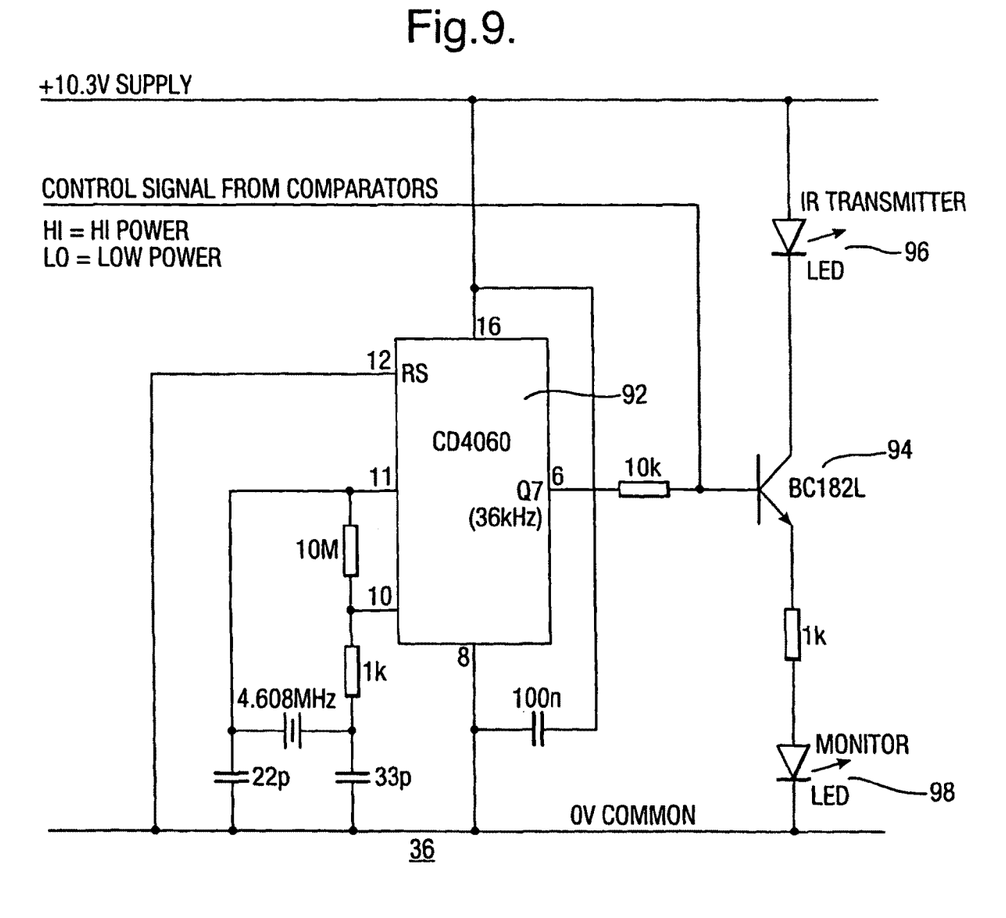
FIG. 9 is a circuit diagram of the feedback transmitter of the inductive power transfer system of FIG. 1.

With both outputs from comparators 84 (VC3) and 88 (VC2) being high, the output from comparator 86 (VC4) also goes high, so setting the output control signal to the to the feedback transmitter (36) to ON as shown in FIG. 8c. When the control signal to the feedback transmitter 36 is ON, this transmitter radiates a signal towards the primary unit 20 of the inductive power transfer system. As has been explained above, when the primary unit's feedback receiver 32 detects the feedback signal from the secondary unit 22, it sets the waveform generator's 28 output waveform, such that the primary unit 20 goes from its low power to high power operational mode.

With the primary unit 20 now operating in its high power mode, the energy transferred into the coupling transformer secondary winding 16 is at maximum intensity, causing the voltage on energy storage capacitor 76 (C2) to rise rapidly as shown by points C to D of FIG. 8b. When this rising voltage on capacitor 76 (C2) exceeds +22V (V2 in FIG. 8b), as sampled by R5, R6 and R7, the output from comparator 90 (VC1) goes low. This then applies a negative potential to the gate of output switch 78 (FET1) with respect to its drain, causing switch 78 (FET1) to switch on and power to be applied to the secondary side load. This instant is illustrated at point D on FIG. 8b.

With the output load now connected onto capacitor 76 (C2), the rate of rise of voltage on the capacitor 76 (C2) reduces, but still continues to rise, as a result of the feedback signal from the secondary unit 22 to the primary unit 20 remaining ON and the primary unit 20 operating at high power. This is shown by points D to E1 in FIG. 8b. Provided that the energy demanded by the load is less than that being transferred from the primary unit 20 (which is still operating in full power mode) to the secondary unit 22, then the voltage on capacitor 76 (C2) will continue to increase. The comparator circuit with hysteresis formed by R10, R11, R12, R13, R14 and comparator 88 (VC2) monitors the voltage applied to the load via switch 78 (FET1) and is set such that its output remains high until the increasing voltage on the load reaches +29.5V (V4 in FIG. 8b). The output of comparator 88 (VC2) then changes to low.

Whilst the voltage on the output load (FIG. 8a) continues to rise towards +29.5V (V4 at point E1 in FIG. 8b), the feedback signal from the secondary side to the primary side remains ON and the primary side continues to operate at high power. When the voltage on the output load reaches +29.5V, comparator 88 (VC2) sets its output to low, (which overrides the output of VC3), comparator's 86 (VC4) output also goes low. The control signal to the feedback transmitter 36 of the primary unit 20 is set to OFF, so causing the primary side to revert to its low power mode.

With the primary unit 20 set to its low power mode, the energy transmitted to the secondary unit 22 is now insufficient to maintain the voltage on capacitor 76 (C2), causing it to discharge into the load and its terminal voltage to consequently fall. The rate of fall is determined by the value of capacitance of capacitor 76 (C2) and the amount of output load present. Thus the voltage applied to the output load will fall from +29.5V, the voltage achieved just prior to the feedback signal being set to off, towards +28.5V, as shown by points E1 to F1 in FIG. 8b. The hysteresis arrangement of comparator circuit R10, R11, R12, R13, R14 and comparator 88 (VC2) causes the output of comparator 88 (VC2) to change back to high when the input falls below +28.5V (V3 in FIG. 8b).

Upon comparator's 88 (VC2) output going high, the control signal to the feedback transmitter 36, the output of comparator 86 (VC4), will also go high. Comparator 88 (VC2) hence effectively monitors the voltage applied to the load and controls the provision, or not, of the feedback signal to the primary unit 20. The primary unit 20, in response to the presence of the feedback signal, switches to a high power mode, transmitting maximum power to the secondary unit 22. The voltage on capacitor 76 (C2) starts to rise again towards +29.5V and on reaching this value (V4 in FIG. 8a), the above cycle is repeated. This is illustrated by points F1 to E2, then E2 to F2 etc in the timing diagram of FIG. 8b.

This hysteresis within the switching of comparator 88 (VC2) at 28.5V and 29.5V results in the voltage on storage capacitor 76 (C2), and hence the load, ramping up from 28.5V to 29.5V under the influence of the energy applied by the primary unit 20 and then ramping down from 29.5V to 28.5V as storage capacitor 76 (C2) gives up its stored energy, i.e. the output voltage applied to the load will be nominally 29V with a 'sawtooth' shaped ripple of 1V peak to peak imposed upon this nominal.

Thus, the energy conveyed to the secondary unit 22, and thence the load, is in the format of bursts of high energy interspersed with low energy periods, under the control of the feedback signal maintaining a regulated voltage (between the said limits) on the output load. The duration of the high power bursts and the intervals between these bursts depend upon the level of the secondary loading, the air gap dimensions over which the primary side to secondary side energy is being transferred and the actual level of the high power bursts (which in turn depends upon the voltage level of the prime input power). If the secondary unit's output load is low, then short infrequent bursts of high energy will be sufficient to maintain the voltage applied to the load within limits. If the secondary unit's load is high, then the repetition rate and duration of the high energy periods will increase to compensate, so maintaining the voltage applied to the load within limits. Similarly, if the input supply to the primary unit 20 varies, which will so cause a variation of the level of energy that is transmitted, then the repetition rate and duration of the high energy periods will also vary to compensate. If the distance between the primary and secondary cores of the transformer 12 should vary, then the repetition rate and duration of the high energy periods will also vary to compensate. Thus, the comparator circuit arrangement maintains secondary side voltage regulation, despite output load changes, air gap variations and input power supply variations, with a simple, single feedback signal arrangement.

So, it will be observed from the above description that the two state primary unit operating states, low power (default state) and high power (commanded state), under the influence of a two state feedback signal from the secondary unit (feedback present or feedback not present) will maintain the voltage regulation upon the secondary unit load, within prescribed voltage ripple limits. Such secondary unit voltage regulation will be maintained over variations of the secondary load, the primary unit's input power and the gap between the primary and secondary units.

If the primary unit 20 is moved away from the secondary unit 22, as would occur in the case of a missile launch when the missile leaves the launch aircraft, or if an item is moved away from a test station on a conveyer belt, then the voltage on capacitor 76 (C2) will continue to decrease. This is illustrated by point G FIG. 8b. At the instant when the voltage has fallen to a predetermined level V2, the output load will be removed via the comparator circuit 90 (VC1), so removing power from the output load as illustrated at point H on FIGS. 8a and 8b. Hence, there is effectively a continuous and substantial power transfer, sufficient to power the missile continuously during carriage on the launch platform.

A similar situation will arise if too great an output load is applied with respect to the amount of energy that can be transmitted over the air gap, but in this case the output voltage will oscillate around +22V (V2 in FIG. 8b) as the overload is present, then switched out, then present, etc. This oscillation is in effect an overload limiter, preventing excessive currents from flowing if a gross overload (for a particular design case) occurs with respect to the output load, so protecting that load and the contactless power transfer system from subsequential damage.

It should be understood that whilst the description above refers to a situation where the secondary unit 22 is initially remote from the primary unit 20 and brought close, the same operating modes occur, but much more rapidly, for the situation where the primary and secondary units are close before prime input power is applied to the primary unit 20. With the primary 20 and secondary 22 units already in close proximity when prime power is applied to the primary side 20, this powers up in its default low power mode. The power transferred across the gap quickly causes the voltage on capacitor 76 (C2) to rise to the V1 threshold and so the power transfer and regulation cycle begins.

FIG. 8 shows the circuitry of the feedback signal transmitter 36. Whilst the feedback signal between the primary and secondary units needs only to be a simple ON/OFF function and could be conveyed over visible light, laser, acoustic, radio frequency, inductive links or many other means, an infra-red transmitting and receiving system has been adopted for this application. A 4.608 MHz reference is divided down to 36 kHz within the CD4060 device 92. The 36 kHz signal is then applied to the constant current configured output transistor 94 when 'permitted' by the control signal from the comparator circuit shown in FIG. 7. The IR transmitting LED device 96 is positioned within the output transistor's collector circuit and is pulsed to a peak level of some 8 mA at 36 kHz when the control signal's state so commands (control set high). There is zero current flow in the IR transmitting LED device 96 when the control signal is set low. A second, monitor, LED 98 is shown in the output transistor's emitter circuit. This LED 98 plays no part in the control of power within the system, only serving to provide a visual indication of the control loop functioning, for test purposes. The 36 kHz switching waveform applied to the LED device providing the secondary side feedback transmitting function is simply a characteristic required to achieve the transmitting and receiving path across the air gap and also provides additional signal waveform security due to its limited operating bandwidth. It should be understood that various other configurations are envisaged and in principal, the feedback signal path could simply be achieved through any arrangement that provides an ON or OFF signal to the primary side Although in the embodiment described, the supply voltages are those typically used in aircraft environments, it should be appreciated that other configurations are also possible. For example, 110Vac or a 3 phase 415Vac with appropriate component changes are contemplated. In addition, although in the described embodiment, the energy applied to the primary winding of the power transformer reverses polarity throughout each switching cycle, it should be appreciated that a constant polarity drive waveform may be applied to the transformer if a larger transformer core size for a given application is used and/or if lower efficiency levels can be tolerated. Although the embodiment of inductive power transfer system described herein employs a half bridge format, it should be appreciated that a full bridge format could be employed for higher power levels.

It should be understood that in addition to the described power amplifier driver circuit configuration, many other circuit configurations are available that could perform this function, dependant on the format of the power amplifier itself and the voltage levels of the prime input power supply. Indeed, the electronic circuits associated with the various components of the inductive power transfer system can be implemented in several different ways by the skilled person and various other configurations are contemplated.

In addition to the infrared elements used in the feedback system of the described embodiment, various other methods of achieving the feedback functionality such as over visible light, laser, acoustic, radio frequency, inductive links are possible. The frequency response requirements of any selected feedback system used in the present power transfer system are very modest in that the upper frequency limit will be no higher than the switching frequency of the power transformer and the lower limit being effectively dc. However, any feedback system used must be capable of functioning in the near vicinity of intense magnetic fields, such as produced within the air gap between the primary and the secondary sections of the power transformer.

Although in the described embodiment the inductors power transfer system is designed for use in an aircraft environment, many different applications of such a system are contemplated. For example, such an inductor power transfer system may be used in factory automation systems, in toots, medical equipment within the petro-chemical industry the preparation of food stuff and other applications where a very high degree of isolation is needed between the input power source and the item being powered.

The invention claimed is:

1. An inductive power transfer system for coupling a power source to a load across an air gap, comprising:
    a primary unit associated with a host platform and a secondary unit for applying a voltage to a load, the secondary unit being separable from the primary unit and arranged to receive power inductively from the primary unit when placed proximate thereto, the primary unit comprising a primary transformer winding and switching means for controlling the application of power to the primary winding and the secondary unit comprising a secondary transformer winding;
    control means comprising a multi-stage comparator circuit for monitoring the applied voltage; and
    feedback means for transmitting a feedback signal to the primary unit when the applied voltage falls below a lower predetermined voltage and for deactivating said feedback signal when the applied voltage exceeds an upper predetermined voltage, wherein the primary unit is arranged to operate in a low power mode where power is applied to the primary winding for minimal period during each switching cycle when no feedback signal is received and a high power mode where power is applied to the primary winding for a majority of each switching cycle when a feedback signal is received so that the applied voltage can be regulated between the upper and the lower predetermined voltages.

2. An inductive power transfer system according to claim 1, wherein in the high power operating mode, power is applied to the primary winding except during a dead-band period at the beginning and end of each switching cycle.

3. An inductive power transfer system according to claims 1, wherein the multi-stage comparator is operable to monitor the voltage induced in the secondary winding and to output a signal to the feedback means when the induced voltage exceeds a first predetermined voltage causing a feedback signal to be transmitted to the primary unit.

4. An inductive power transfer system according to claim 1, wherein the multi-stage comparator is arranged to monitor the voltage level in a storage capacitor coupled to the secondary winding and to activate an output switch to apply power to the load when the voltage level exceeds a second predetermined voltage.

5. An inductive power transfer system according to claim 4, wherein the multi-stage comparator circuit is operable to monitor the voltage applied to the load and to output a signal to the feedback means when the applied voltage exceeds said upper predetermined voltage causing the feedback signal to the primary unit to be deactivated.

6. An inductive power transfer system according to claim 5, wherein the multi-stage comparator is operable to output a signal to the feedback means when the applied voltage falls below said lower predetermined voltage causing a feedback signal to be transmitted to the primary unit.

7. An inductive power transfer system according to claim 1, further comprising a tuning capacitor connected in parallel with the secondary winding.

8. An inductive power transfer system according to claim 7, wherein the tuning capacitor is arranged to resonate at a predetermined frequency when the width of the air gap separating the transformer cores of the primary and secondary windings is a predetermined maximum value.

9. An inductive power transfer system according to claim 1, wherein the width of the air gap between the primary and secondary windings lies in the range 1 to 6 mm.

10. An inductive power transfer system according to claim 1, wherein in low power mode operation, power is applied to the primary winding for 5% of the switching cycle.

11. An inductive power transfer system according to claim 1, wherein in high power mode operation, power is applied to the primary winding for 95% of the switching cycle.

12. An inductive power transfer system according to claim 1, wherein the power source is arranged to produce an output dc voltage of 270V.

13. An inductive power transfer system according to claim 1, wherein the power source includes a local power source arranged to supply components within the primary unit.

14. An inductive power transfer system according to claim 1, wherein the feedback means comprises an infrared system.

15. An inductive power transfer system according to claim 1, wherein the switching means comprises a power amplifier that applies power to the primary winding in a push-pull format.

16. An inductive power transfer system according to claim 1, wherein the primary unit is carried by a host aircraft and the secondary unit is carried by a launchable vehicle.

17. An inductive power transfer system according to claim 1, wherein said applied voltage can be regulated between the upper and the lower predetermined voltages independent of variations of the input supply to the primary unit, variations in the air gap between the primary and secondary units and variations in the current demanded by the load.

18. An inductive power transfer system according to claim 1, wherein a storage capacitor is coupled to the secondary winding and when the applied voltage exceeds an upper predetermined voltage and the feedback signal is deactivated the storage capacitor discharges into the load.

19. An inductive power transfer system for coupling a power source to a load across an air gap, comprising:
    a primary unit associated with a host platform and a secondary unit for applying a voltage to the load, the secondary unit being separable from the primary unit and arranged to receive power inductively from the primary unit when placed proximate thereto, the primary unit comprising a primary transformer winding and switches for controlling the application of power to the primary winding and the secondary unit comprising a secondary transformer winding;
    a control circuit comprising a multi-stage comparator circuit for monitoring the applied voltage; and
    a feedback loop for transmitting a feedback signal to the primary unit when the applied voltage falls below a lower predetermined voltage and for deactivating said feedback signal when the applied voltage exceeds an upper predetermined voltage, wherein the primary unit is arranged to operate in a low power mode where power is applied to the primary winding for minimal period during each switching cycle when no feedback signal is received and a high power mode where power is applied to the primary winding for the majority of each switching cycle when a feedback signal is received so that the applied voltage can be regulated between the upper and the lower predetermined voltages.

* * * * *